US012505822B2

(12) United States Patent
Milne et al.

(10) Patent No.: US 12,505,822 B2
(45) Date of Patent: Dec. 23, 2025

(54) USE OF WHITE NOISE IN AUDITORY DEVICES

(71) Applicant: Sony Group Corporation, Tokyo (JP)

(72) Inventors: James R. Milne, Romona, CA (US); Justin Kenefick, San Diego, CA (US); Allison Burgueno, Oceanside, CA (US); Gregory Carlsson, Santee, CA (US)

(73) Assignee: SONY GROUP CORPORATION, Tokyo (JP)

( * ) Notice: Subject to any disclaimer, the term of this patent is extended or adjusted under 35 U.S.C. 154(b) by 236 days.

(21) Appl. No.: 18/209,991

(22) Filed: Jun. 14, 2023

(65) Prior Publication Data

US 2024/0420672 A1 Dec. 19, 2024

(51) Int. Cl.
*G10K 11/175* (2006.01)

(52) U.S. Cl.
CPC .................................. *G10K 11/175* (2013.01)

(58) Field of Classification Search
CPC ........ H04R 25/75; H04R 25/70; H04R 25/00; H04R 2225/41; A61B 5/128; G10K 11/175
USPC ............................................ 381/73.1; 600/28
See application file for complete search history.

(56) References Cited

U.S. PATENT DOCUMENTS

2008/0205660 A1* 8/2008 Goldstein ................ G01H 3/14 381/60
2015/0073296 A1* 3/2015 Zeng ...................... A61B 5/128 600/559
2015/0092972 A1 4/2015 Wei-Shin
2022/0370249 A1* 11/2022 Pangarkar ........ G10K 11/17873
2023/0001127 A1* 1/2023 Khalil ................... A61M 21/00

FOREIGN PATENT DOCUMENTS

CN 102075842 A 5/2011
CN 107569236 A 1/2018
KR 20200027795 * 3/2020
KR 20210154953 A 12/2021
WO WO-2022023951 A1 2/2022

* cited by examiner

*Primary Examiner* — Norman Yu
(74) *Attorney, Agent, or Firm* — Trellis IP Law Group, PC

(57) ABSTRACT

A computer-implemented method monitors a background SPL. The method also determines that the background SPL is below a first SPL threshold. A speaker of an auditory device plays white noise. The method, responsive to determining that the white noise has played for a first length that meets a first time threshold or that the background SPL meets the first SPL threshold, stops playing the white noise. The method further includes continuing to monitor the background SPL until the background SPL is below the first SPL threshold.

19 Claims, 6 Drawing Sheets

USE OF WHITE NOISE IN AUDITORY DEVICES

BACKGROUND

An estimated 50 million people in the United States suffer from tinnitus, which is defined as a sound heard by people with no external source. There are many causes of tinnitus, including long-term exposure to loud noises, middle-ear problems, a symptom of Meniere's disease, and aging.

There are a variety of treatments for tinnitus, including cognitive behavioral therapy, hypnosis, massage therapy, treating underlying conditions, and medication. However, there is no known cure.

SUMMARY

A computer-implemented method includes monitoring a background sound pressure level (SPL). The method further includes determining that the background SPL is below a first SPL threshold. The method further includes playing, with a speaker of an auditory device, white noise. The method further includes responsive to determining that the white noise has played for a first length that meets a first time threshold or that the background SPL meets the first SPL threshold, stop playing the white noise. The method further includes continuing to monitor the background SPL until the background SPL is below the first SPL threshold.

In some embodiments, the method further includes training a machine-learning model to output at least one parameter selected from the group of the first SPL threshold, the first time threshold, a sound level of the white noise, and combinations thereof based on a training data set that includes hearing profiles for users, background SPLs, SPL thresholds, and time thresholds, where wherein the machine-learning model is a neural network. In some embodiments, the method further includes receiving the background SPL and a hearing profile that corresponds to a user associated with the auditory device and outputting at least one parameter selected from the group of the first time threshold, the first SPL threshold, a sound level of the white noise, and combinations thereof as output. In some embodiments, the method further includes determining that the background SPL meets a second SPL threshold during a time associated with sleeping, playing, with the speaker of the auditory device, the white noise, and responsive to determining that the white noise has played for a second length that meets a second time threshold or that the background SPL falls below the second SPL threshold, stop playing the white noise. In some embodiments, the method further includes training a machine-learning model to output at least one parameter selected from the group of the second SPL threshold, the second time threshold, and combinations thereof based on a training data set that includes activity data that describes movement of people associated with auditory devices, background SPLs, SPL thresholds, and time thresholds. In some embodiments, the method further includes receiving the background SPL and activity data that corresponds to a user associated with the auditory device and outputting at least one parameter selected from the group of the second SPL threshold, the second time threshold, a sound level of the white noise, and combinations thereof as output. In some embodiments, the method further includes receiving a request from a user for the white noise and playing, with the speaker of the auditory device, the white noise. In some embodiments, the request from the user is received from at least one of a verbal instruction detected by a voice pick-up sensor, the verbal instruction detected by a microphone, a tap detected by a motion sensor, a gesture detected by the motion sensor, user input from a user device, and combinations thereof. In some embodiments, the method further includes determining, before playing the white noise, that the background SPL is below the SPL threshold for a predetermined amount of time, wherein playing the white noise is responsive to the determining. In some embodiments, the method further includes generating noise cancellation sound waves that are played along with the white noise to reduce distractions from the background SPL.

An auditory device includes one or more processors and logic encoded in one or more non-transitory media for execution by the one or more processors and when executed are operable to: monitor a background SPL; determine that the background SPL is below a first SPL threshold; play, with a speaker of the auditory device, white noise; responsive to determining that the white noise has played for a first length that meets a first time threshold or that the background SPL meets the first SPL threshold, stop playing the white noise; and continue to monitor the background SPL until the background SPL is below the first SPL threshold.

In some embodiments, the logic is further operable to train a machine-learning model to output at least one parameter selected from the group of the first SPL threshold, the first time threshold, a sound level of the white noise, and combinations thereof based on a training data set that includes hearing profiles for users, background SPLs, SPL thresholds, and time thresholds, where the machine-learning model is a neural network. In some embodiments, the logic is further operable to receive the background SPL and a hearing profile that corresponds to a user associated with the auditory device and output at least one parameter selected from the group of the first time threshold, the first SPL threshold, a sound level of the white noise, and combinations thereof as output. In some embodiments, the logic is further operable to determine that the background SPL meets a second SPL threshold during a time associated with sleeping; play, with the speaker of the auditory device, the white noise; and responsive to determining that the white noise has played for a second length that meets a second time threshold or that the background SPL falls below the second SPL threshold, stop playing the white noise. In some embodiments, the logic is further operable to train a machine-learning model to output at least one parameter selected from the group of the second SPL threshold, the second time threshold, and combinations thereof based on a training data set that includes activity data that describes movement of people associated with auditory devices, background SPLs, SPL thresholds, and time thresholds.

Software encoded in one or more non-transitory computer-readable media for execution by the one or more processors and when executed is operable to: monitor a background SPL; determine that the background SPL is below a first SPL threshold; play, with a speaker of an auditory device, white noise; responsive to determining that the white noise has played for a first length that meets a first time threshold or that the background SPL meets the first SPL threshold, stop playing the white noise; and continue to monitor the background SPL until the background SPL is below the first SPL threshold.

In some embodiments, the software is further operable to train a machine-learning model to output at least one parameter selected from the group of the first SPL threshold, the first time threshold, a sound level of the white noise, and combinations thereof based on a training data set that includes hearing profiles for users, background SPLs, SPL thresholds, and time thresholds, where the machine-learning model is a neural network. In some embodiments, the software is further operable to determine that the background SPL meets a second SPL threshold during a time associated with sleeping; play, with the speaker of the auditory device, the white noise; and responsive to determining that the white noise has played for a second length that meets a second time threshold or that the background SPL falls below the second SPL threshold, stop playing the white noise. In some embodiments, the software is further operable to train a machine-learning model to output at least one parameter selected from the group of the second SPL threshold, the second time threshold, and combinations thereof based on a training data set that includes activity data that describes movement of people associated with auditory devices, background SPLs, SPL thresholds, and time thresholds.

As a result of the techniques described below, the auditory device advantageously uses white noise to treat tinnitus and/or help a user to sleep.

A further understanding of the nature and the advantages of particular embodiments disclosed herein may be realized by reference of the remaining portions of the specification and the attached drawings.

DETAILED DESCRIPTION OF EMBODIMENTS

Example Environment 100

Figure 1:
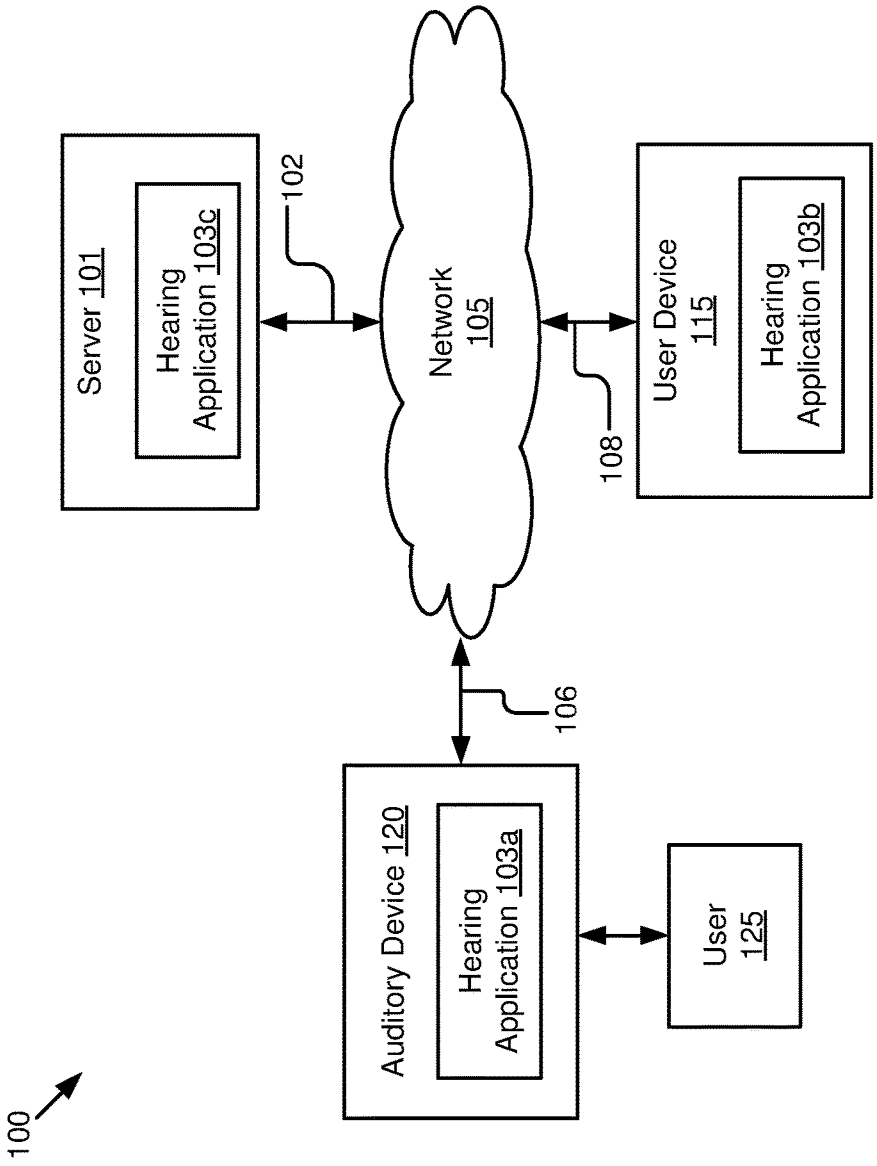
FIG. 1 is a block diagram of an example environment according to some embodiments described herein.

FIG. 1 illustrates a block diagram of an example environment 100. In some embodiments, the environment 100 includes an auditory device 120, a user device 115, and a server 101. A user 125 is associated with the user device 115 and the auditory device 120. In some embodiments, the environment 100 may include other servers or devices not shown in FIG. 1. In FIG. 1 and the remaining figures, a letter after a reference number, e.g., "103*a*," represents a reference to the element having that particular reference number (e.g., a hearing application 103*a* stored on the user device 115). A reference number in the text without a following letter, e.g., "103," represents a general reference to embodiments of the element bearing that reference number (e.g., any hearing application).

The auditory device 120 may include a processor, a memory, a microphone, and a speaker. The auditory device 120 may include a hearing aid, ear buds, or headphones. In some embodiments, the auditory device 120 includes one auditory device 120 for each ear. The auditory device 120 may be in-ear hearing aids or external hearing aids. More specifically, the auditory device 120 may include devices that are invisible in the canal, completely in the canal, in the canal, half shell, full shell, behind the ear, or other variations. The auditory device 120 may be ear buds that reside inside the ear, around the ear headphones, wireless headphones, wired headphones, etc.

In the illustrated implementation, auditory device 120 is coupled to the network 105 via signal line 106. Signal line 106 may be a wired connection, such as Ethernet, coaxial cable, fiber-optic cable, etc., or a wireless connection, such as Wi-Fi®, Bluetooth®, or other wireless technology.

In some embodiments, the auditory device 120 includes a hearing application 103*a* that instructs a speaker of the auditory device 120 to play white noise. White noise refers to sound that includes all frequencies across the spectrum of audible sound in equal measure. Although the examples in the application include white noise, other types of noise may be used. For example, pink noise is a broadband sound containing components from across the sound spectrum. In another example, brown noise (also known as red noise) contains sounds from every octave of the sound spectrum, but the power behind frequencies decreases with each octave. In some embodiments, a custom noise that distracts the user from tinnitus or background noises may also be used.

In one example, the hearing application 103*a* monitors a background sound pressure level (SPL) and determines that the background SPL is below a first SPL threshold, such as when the user 125 is in a room with almost no noise. The auditory device 120 plays white noise by directly generating the white noise or receiving the white noise from the user device 115. Once the white noise has been played for a first length that meets a first time threshold or that the background SPL meets the first SPL threshold, the auditory device 120 turns off the white noise. The hearing application 103*a* may continue monitoring the background SPL until the background SPL is again below the first SPL threshold and the process repeats.

In some embodiments, the auditory device 120 plays white noise in response to a manual command. In some embodiments, the hearing application 103*a* trains a machine-learning model to output a first SPL threshold and/or a first time threshold. In some embodiments, the hearing application 103*a* generates a hearing profile that describes a hearing ability of a user and any hearing conditions, including tinnitus. The hearing application 103*a* may train the machine-learning model based on using hearing profiles as part of the training data.

The white noise may advantageously be used to treat tinnitus and other conditions. For example, sounds inside the head can be heard when there is acoustic isolation from the external environment, which exacerbates tinnitus. The hearing application 103*a* determines that the white noise should be played during quiet times to distract the user from their tinnitus and/or human body sounds.

In another example, the hearing application 103*a* may determine that the background SPL meets a second SPL threshold during a time associated with sleeping. For example, when the user 125 is trying to sleep at night, road noise, fireworks, television noise, etc. may interfere with the user's 125 ability to sleep because it exceeds the second SPL threshold. The auditory device 120 plays the white noise until the white noise has played for a second length that meets a second time threshold or until the background SPL falls below the second SPL threshold, at which time the auditory device 120 turns off the white noise.

The user device 115 may be a computing device that includes a memory, a hardware processor, and a hearing application 103*b*. The user device 115 may include a smart phone, a mobile telephone, a tablet computer, a desktop computer, a wearable device (e.g., a smart watch), a mobile email device, or another electronic device capable of accessing a network 105 to communicate with the server 101 and capable of communicating with the auditory device 120.

In the illustrated implementation, user device 115 is coupled to the network 105 via signal line 108. Signal line 108 may be a wired connection, such as Ethernet, coaxial cable, fiber-optic cable, etc., or a wireless connection, such as Wi-Fi®, Bluetooth®, or other wireless technology. The user device 115 is used by way of example. While FIG. 1 illustrates one user device 115, the disclosure applies to a system architecture having one or more user devices 115.

The hearing application 103*b* on the user device 115 may be used to generate graphical data to display a user interface that accepts user input for configuring user preferences. For example, a user may want to provide a first threshold SPL below which the white noise is played in a quiet environment, a second threshold SPL above which the white noise is played during a time associated with sleeping, a time that the white noise is played, and/or a preference for using machine learning to determine the different parameters. The hearing application 103*b* may transmit the user preferences to the hearing application 103*a* stored on the auditory device.

The server 101 may include a processor, a memory, and network communication hardware. In some embodiments, the server 101 is a hardware server. The server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology.

In some embodiments, the server 101 includes a hearing application 103*c*. In some embodiments and with user consent, the hearing application 103*c* on the server 101 maintains a copy of user profiles that include user preferences and/or hearing profiles.

Example Computing Device 200

Figure 2:
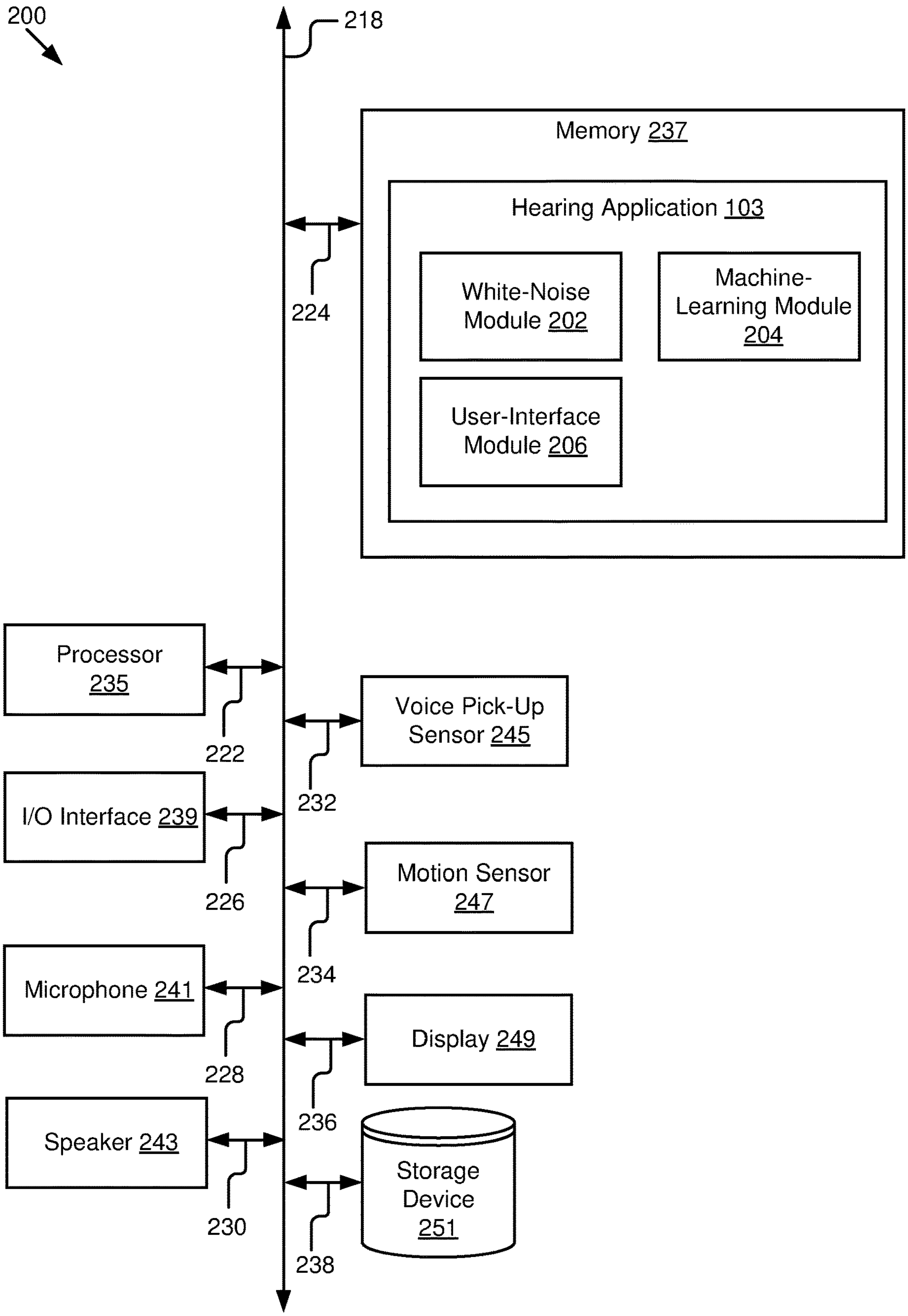
FIG. 2 is a block diagram of an example computing device according to some embodiments described herein.

FIG. 2 is a block diagram of an example computing device 200 that may be used to implement one or more features described herein. The computing device 200 can be any suitable computer system, server, or other electronic or hardware device. In one example, the computing device 200 is the auditory device 120 or the user device 115 illustrated in FIG. 1.

In some embodiments, computing device 200 includes a processor 235, a memory 237, an Input/Output (I/O) interface 239, a microphone 241, a speaker 243, a voice pick-up sensor 245, a motion sensor 247, a display 249, and a storage device 251. Although particular components of the computing device 200 are illustrated, other components may be added or removed. For example, if the computing device 200 is an auditory device, the computing device 200 does not include the display 249. In another example, if the computing device 200 is a user device, the computing device 200 may not include the voice pick-up sensor 245 or the motion sensor 247.

The processor 235 may be coupled to a bus 218 via signal line 222, the memory 237 may be coupled to the bus 218 via signal line 224, the I/O interface 239 may be coupled to the bus 218 via signal line 226, the microphone 241 may be coupled to the bus 218 via signal line 228, the speaker 243 may be coupled to the bus 218 via signal line 230, the voice pick-up sensor 245 may be coupled to the bus 218 via signal line 232, the motion sensor 247 may be coupled to the bus 218 via signal line 234, the display 249 may be coupled to the bus 218 via signal line 236, and the storage device 251 may be coupled to the bus 218 via signal line 238.

The processor 235 can be one or more processors and/or processing circuits to execute program code and control basic operations of the computing device 200. A processor includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, or other systems. A computer may be any processor in communication with a memory.

The memory 237 is typically provided in computing device 200 for access by the processor 235 and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 235 and/or integrated therewith. Memory 237 can store software operating on the computing device 200 by the processor 235, including the hearing application 103.

In some embodiments, the I/O interface 339 implements a Bluetooth or Wi-Fi protocol for processing, transmitting, and receiving wireless signals. For example, the wireless protocol may be Bluetooth, Bluetooth 5.0, Bluetooth 5.1, Bluetooth 5.2 (i.e., Bluetooth Classic), Bluetooth 5.3, Bluetooth LE, Bluetooth LE Audio, Wi-Fi, and/or a proprietary standard created by the manufacturer of the auditory device.

The I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., the memory 237 or the storage device 251), and input/output devices can communicate via I/O interface 239. In some embodiments, the I/O interface 239 can connect to interface devices such as input devices (keyboard, pointing device, touchscreen, microphone, sensors, etc.) and/or output devices (display 341, speakers, etc.).

The microphone 241 includes hardware for detecting sounds. For example, the microphone 241 may detect background SPL, ambient noises, people speaking, music, etc. The microphone 341 may provide information about some of the sounds to the hearing application 103 and convert some of the detected sounds to an electrical signal that is transmitted to the speaker 243 via the I/O interface 239.

The speaker 243 includes hardware for receiving the electrical signal from the microphone 241 and converts the electrical signal into sound waves that are output for the user to hear. For example, the speaker 243 may include a digital to analog converter that converts the electrical signal to sound waves. In some embodiments, the speaker 243 also includes an amplifier that is used to amplify, reduce, or block certain sounds based on a particular setting. For example, the amplifier may block ambient noise when a noise cancelling setting is activated.

The voice pick-up sensor 245 includes hardware for detecting jaw vibrations due to speech. The voice pick-up sensor 245 relies on bone conduction to detect jaw vibrations created by speaking.

The motion sensor 247 includes hardware for detecting a gesture or a tap from the user. In some embodiments, the motion sensor is a proximity sensor that identifies particular gestures made by the user's hand that are associated with particular instructions. In some embodiments, the motion sensor detects when the user makes contact with the computing device 200. For example, the user may tap the computing device 200 or press a button on the computing device 200.

The storage device 251 stores data related to the hearing application 103. For example, the storage device 251 may store a user profile that includes user preferences and/or a hearing profile.

Example Hearing Application 103

In some embodiments, the hearing application 103 includes a white-noise module 202, a machine-learning module 204, and a user-interface module 206.

The white-noise module 202 determines when to instruct the speaker 243 to play white noise. In some embodiments, the white-noise module 202 receives information about the type of auditory device worn by a user.

The white-noise module 202 monitors a background SPL. For example, the white-noise module 202 may receive information from the microphone 241 about the SPL as measured in decibels. In cases where the white noise is used to treat tinnitus, the white-noise module 202 may determine that the background SPL is below a first SPL threshold. For example, the first SPL threshold may be around 25 to 30 decibels.

The first SPL threshold may be a default setting, defined by a user, or determined by a machine-learning model as discussed in greater detail below. In some embodiments, the first SPL threshold may be based on a type of auditory device. For example, some auditory devices may be better at isolating all sounds, such as when a hearing aid uses a power dome to provide a full seal around the ear canal. The isolation may help users, particularly when the users have experienced severe hearing loss, but the more isolating the auditory device, the more a user may be bothered by tinnitus. As a result, the first SPL threshold may be lower for auditory devices that block out more noise than for auditory devices that have holes or openings to allow some natural noise to filter through to the ear canal.

The white-noise module 202 may wait a predetermined amount of time (e.g., five seconds, 30 seconds, a minute, etc.) before instructing the speaker 243 to play white noise. The predetermined amount of time may be used to ensure that the quiet time is more than a momentary quiet in the background noise. For example, the white-noise module 202 may use the principle of hysteresis to determine whether the background SPL is below the first SPL threshold for a sufficient amount of time.

The instructions provided by the white-noise module 202 to the speaker 243 may include an electrical signal that the speaker 243 converts to sound. In some embodiments where the computing device 200 is an auditory device, the white-noise module 202 may receive the electrical signal corresponding to white noise from a user device. The white-noise module 202 may provide the electrical signal to the speaker 243 and instruct the speaker 243 to play the white noise based on the electrical signal.

In some embodiments, the loudness of the white noise may be a default setting. In some embodiments, the loudness is determined based on user input, such as when a user is provided with test sounds and the user identifies which loudness is preferable.

In some embodiments, the white-noise module 202 generates noise cancellation electrical signals for sound waves that are provided to the speaker 243 to combine with the white noise to reduce distractions from the background SPL. For example, the microphone 241 monitors the sounds in the background and the white-noise module 202 generates electrical signals with frequencies that are the opposite signal to the background noise to effectively cancel out both sets of sounds when the soundwaves collide. As a result, even low background noise is reduced by the noise cancellation.

After the white noise has played for a first length that meets a first time threshold (e.g., 30 seconds, one minute, five minutes, etc.) or after the background SPL meets the first SPL threshold, the white-noise module 202 instructs the speaker 243 to stop playing the white noise. The first time threshold may be used to prevent the user from getting annoyed at the white noise playing for too long or to help train the body to stop focusing on the noise created by the tinnitus and instead interpret the noise created by the tinnitus as irrelevant. In addition, playing white noise for shorter intervals may be more effective in treating tinnitus. The first time threshold may be a default setting, defined by a user, or determined by a machine-learning model as discussed in greater detail below.

In some embodiments, if the background SPL meets the first SPL threshold or if the background SPL meets the first SPL threshold, the white-noise module 202 waits a predetermined amount of time (e.g., five seconds, 30 seconds, a minute, etc.) before instructing the speaker 243 to stop playing the white noise. The time delay may be used to ensure that the increase in background noise is not simply a temporary loud noise. For example, the white-noise module 202 may use hysteresis to determine that the background SPL meets the first SPL threshold for a sufficient amount of time.

The white-noise module 202 may continue to monitor the background SPL until the background SPL is below the first SPL threshold and then restart the previous steps. In some embodiments, the white-noise module 202 implements a delay so that the white noise is not played too frequently. For example, the white-noise module 202 may play white noise for one minute, wait five minutes, and play the white noise for a minute again as long as the background SPL is below the first SPL threshold.

In some embodiments, the white-noise module 202 may instruct the speaker 243 to play white noise in response to receiving a manual request from the user. The manual request may be used, for example, by a user that wants to listen to white noise to help the user sleep, such as when the user is on an airplane, bus, train, etc. and the background noise interferes with the user's ability to sleep.

The manual request may be received via a voice pick-up sensor 245 that detects vibrations from a user that provides verbal instructions. The white-noise module 202 may identify that the vibrations correspond to a particular command to turn on the white noise. The manual request may be received via a microphone 241 that detects the verbal instructions. The manual request may be a tap detected by a motion sensor 247. For example, a first tap may indicate a desire for white noise (or a long press, or multiple taps, etc.)

and a second tap may indicate a desire to stop playing the white noise. The manual request may be a gesture detected by the motion sensor 247. For example, the user may move a finger up or down, wave a hand in a particular motion, approach the auditory device with a finger, etc. The manual request may include user input provided to a user interface generated by the user device. For example, the user interface may include an option for turning on white noise, increasing the volume of white noise, etc.

In some embodiments, the white-noise module 202 also instructs the speaker 243 to play white noise while a user is trying to sleep. In this case, the white-noise module 202 identifies when the background SPL is loud enough that it may interfere with the user's ability to sleep. The white-noise module 202 determines that the background SPL meets a second SPL threshold during a time associated with sleeping. For example, some people experience disturbed sleep when background noise is between 30-40 decibels and noise above 40 decibels consistently cause sleep disturbances. The second SPL threshold may be a default setting, defined by a user, or determined by a machine-learning model as discussed in greater detail below.

The white-noise module 202 instructs the speaker 243 to play white noise. The white noise may be played at 85 decibels or lower for eight hours. The speaker 243 may safely play white noise at 85 decibels for eight hours without causing hearing loss. The speaker 243 may play white noise at increments of three decibels for half the time without causing hearing loss. For example, the speaker 243 may play the white noise at 88 decibels for four hours, 91 decibels for two hours 93 decibels for one hour, etc.

Responsive to determining that the white noise has played for a second length that meets a second time threshold or that the background SPL falls below the second SPL threshold, the white-noise module 202 instructs the speaker 243 to stop playing the white noise. In some embodiments, the white-noise module 202 does not instruct the speaker 243 to stop playing the white noise unless the background SPL is below the second SPL threshold for a predetermined amount of time to ensure that the quiet is not a momentary respite from the noise, such as a break between fireworks. The second time threshold and/or the predetermined amount of time may be default settings, defined by a user, or determined by a machine-learning model as discussed in greater detail below.

In some embodiments, the white-noise module 202 receives user data that is used to determine whether to turn on the white noise. For example, the white-noise module 202 may receive activity data from a smartwatch worn by the user that indicates that the user is awake or restless. In another example, the white-noise module 202 may receive user data from the user device indicating that the user is awake during a time when the user is typically sleeping.

The machine-learning module 204 trains a machine-learning model using training data to output parameters that include an SPL threshold, a time threshold, and/or a sound level of the white noise.

In some embodiments, the machine-learning model is a neural network. Neural networks can learn and model the relations between input data and output data that are non-linear and complex. The neural network may include an input layer, a hidden layer, and an output layer. The input layer may receive input data, the hidden layer takes its input from the input layer or other hidden layers, and the output layer provides the final result of the data processing. The neural network may use a backpropagation algorithm that learns continuously by using corrective feedback loops to improve predictive analytics. The neural network may be a convolutional neural network where the hidden layers perform specific mathematical functions, such as summarizing or filtering.

In some embodiments where the machine-learning model helps treat tinnitus by outputting a first SPL threshold, a first time threshold, and/or a sound level of the white noise, the machine-learning model is trained using training data that includes hearing profiles for users, background SPLs, SPL thresholds, and time thresholds. The hearing profiles in combination with the background SPLs, SPL thresholds, and time thresholds may be used to elucidate patterns between a user's ability to hear, a user's hearing conditions, and a preferred first SPL threshold, first time threshold, and/or sound level of the white noise.

In some embodiments where the machine-learning model helps a user sleep by outputting a second SPL threshold, a second time threshold, and/or the sound level of the white noise, the machine-learning model is trained using training data that includes activity data associated with users, background SPLs, SPL thresholds, and time thresholds. The activity data may indicate situations when a user slept soundly or was restless, which the machine-learning model can compare to the background SPLs to determine patterns in how a user is affects by SPL thresholds, and time thresholds for playing white noise.

In some embodiments, the machine-learning model determines that a particular situation is one during which the user wants to sleep based on a combination of the activity data, the background SPL, and in some embodiments, additional information. The additional information may include indications that the user is travelling on a plane, a bus, a train, a car (as a passenger), etc. In some embodiments, the machine-learning model may have information about the user's sleeping patterns, such as when they sleep and when they nap, and the white noise may be automatically activated if the background SPL meets a second SPL threshold during a time associated with sleeping (i.e., the hours during which the user typically sleeps or naps).

The user-interface module 206 generates graphical data for displaying a user interface to a user. In some embodiments, the user interface receives user input for configuring user preferences for how the hearing application 103 works. For example, the user interface may include options for configuring particular verbal instructions, particular gestures, a number of taps, etc. The user interface may also include an option for manually requesting that the white noise be turned on or off. The user interface may also include an option for implementing a programmable delay before the white noise is turned on.

Figure 3A:
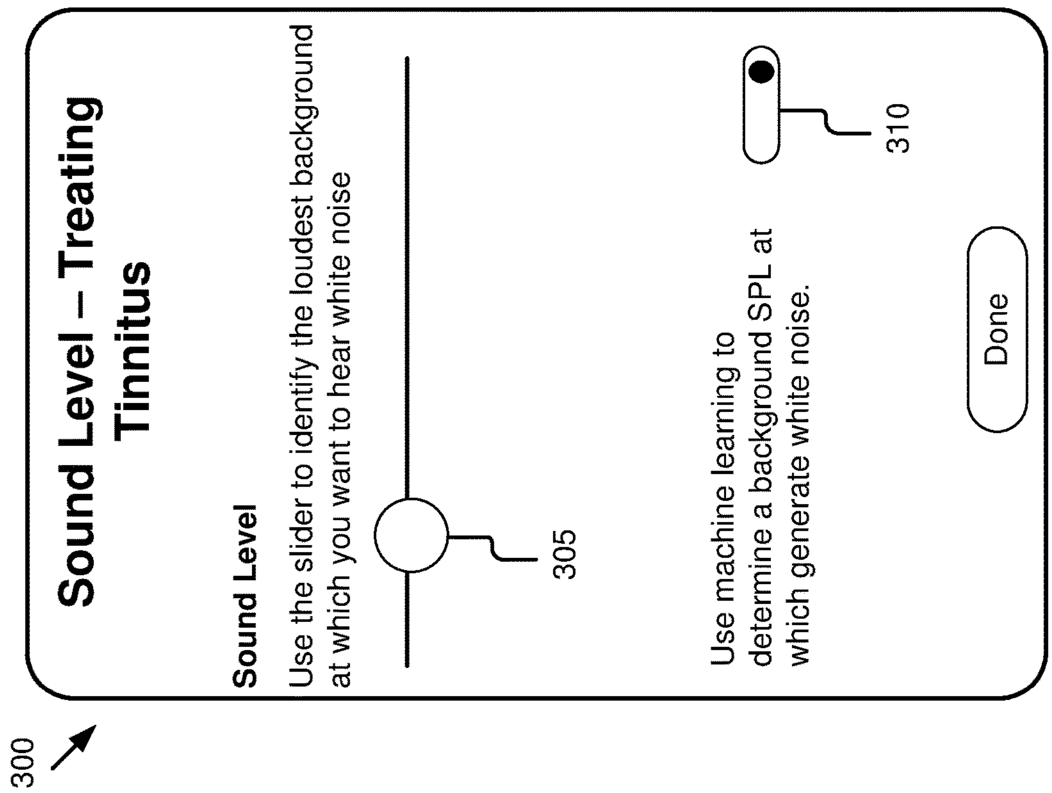
FIG. 3A is an illustration of an example user interface for defining user preferences for sound levels according to some embodiments described herein.

FIG. 3A is an illustration of an example user interface 300 for defining user preferences for sound levels. In this example, a user may specify a sound level for the white noise using a slider 305. In some embodiments, each time the user stops the slider at a particular location, the auditory device plays a test sound that corresponds to the selected sound level. Other mechanisms for configuring the sound level of the background are possible, such as a drop-down menu, a field that receives user input, etc.

The example user interface 300 also includes a radio button 310 for turning on or off an option for using machine learning to determine a background SPL at which to play white noise. This user interface 300 may apply to using white noise to treat tinnitus, but the user interface 300 may be modified to apply to using white noise to help with sleep as well.

Figure 3B:
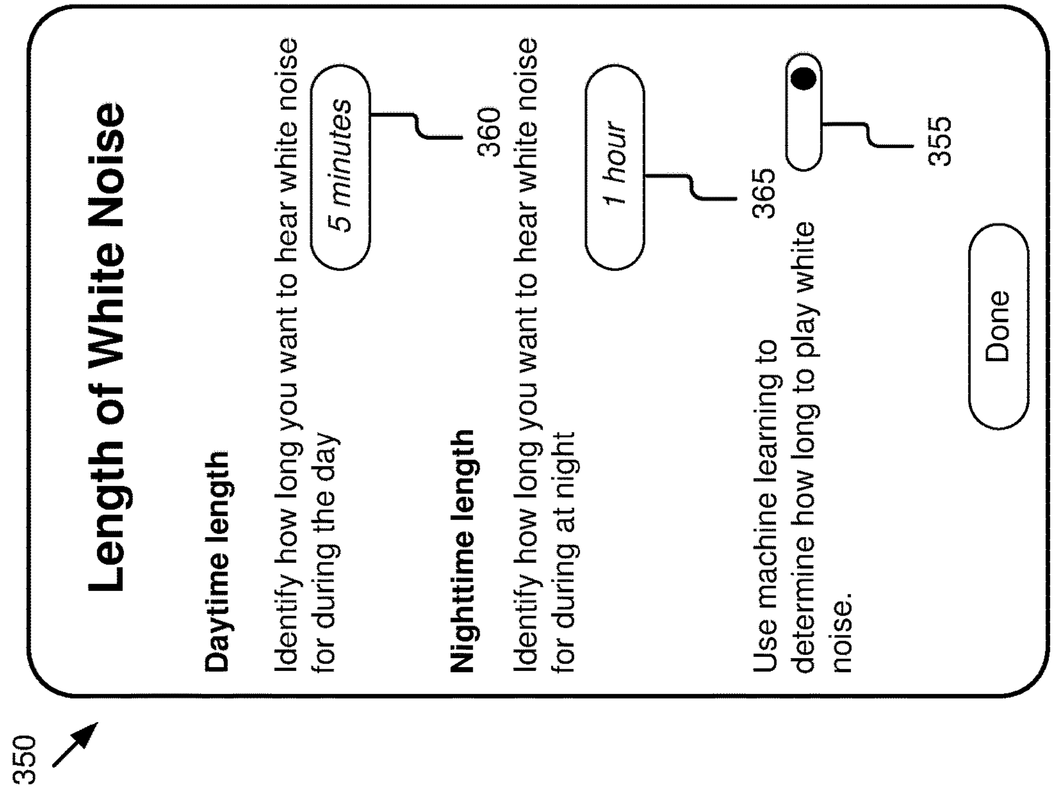
FIG. 3B is an illustration of an example user interface for defining user preferences for length of white noise according to some embodiments described herein.

FIG. 3B is an illustration of an example user interface 350 for defining user preferences for a length of white noise. In this example, the user defines a first length for how long the white noise plays, a second length for how long the white noise plays, and a radio button 355 for using machine learning to determine how long to play white noise. In this example, the user may specify the first length and the second length by providing a length of time in the corresponding fields 360, 365.

Example Methods

While the methods are described with reference to white noise, in some embodiments, the noise may be a different type, such as brown noise, pink noise, or a custom noise created to treat tinnitus or help the user sleep.

Figure 4:
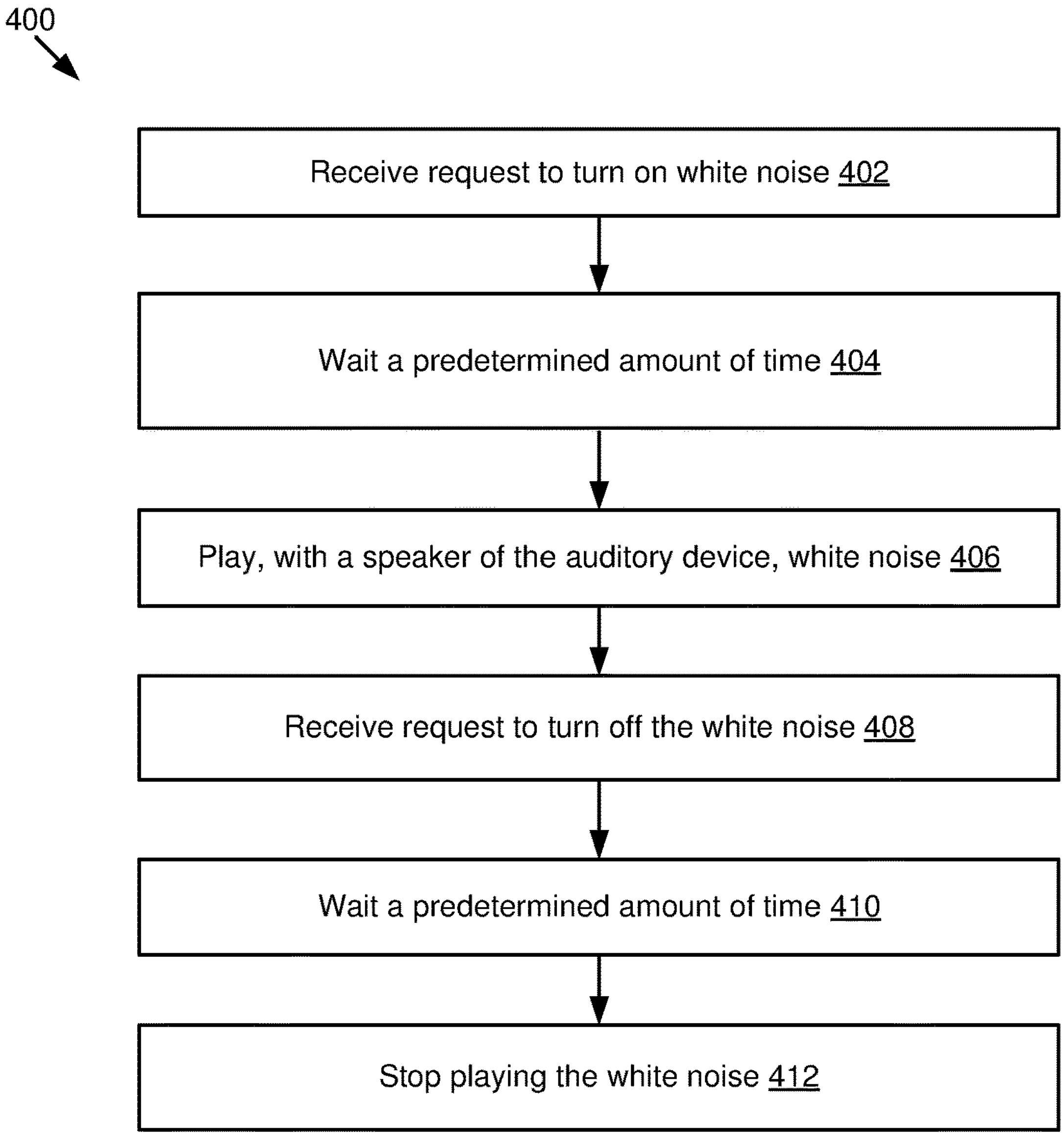
FIG. 4 illustrates a flowchart of an example method to manually activate white noise according to some embodiments described herein.

FIG. 4 illustrates a flowchart of an example method 400 to manually activate white noise. The method 400 may be performed by the computing device 200 in FIG. 2. For example, the computing device 200 may be the auditory device 120 or the user device 115, or in part the auditory device 120 and in part the user device 115 illustrated in FIG. 1. The computing device 200 includes a hearing application 103 that implements the steps described below.

The method may begin with block 402. At block 402, a request to turn on white noise is received. For example, a user may provide a verbal instruction that is detected by a voice pick-up sensor or a microphone, the user may provide a tap that is detected by a motion sensor, the user may make a gesture that is detected by a motion sensor, or the user may provide user input. Block 402 may be followed by block 404.

At block 404, a predetermined amount of time occurs. The predetermined amount of time may be set by a default time value or specified by a user. Block 404 may be followed by block 406.

At block 406, a speaker of the auditory device plays white noise. In some embodiments, the white noise is generated by the hearing application stored on the computing device or received from a user device. Block 406 may be followed by block 408.

At block 408, a request to turn off the white noise is received. For example, a user may provide a verbal instruction that is detected by a voice pick-up sensor or a microphone, the user may provide a tap that is detected by a motion sensor, the user may make a gesture that is detected by a motion sensor, or the user may provide user input. Block 408 may be followed by block 410.

At block 410, a predetermined amount of time occurs. Block 410 may be followed by block 412.

At block 412, the white noise stops playing. For example, the speaker stops playing the white noise.

Figure 5:
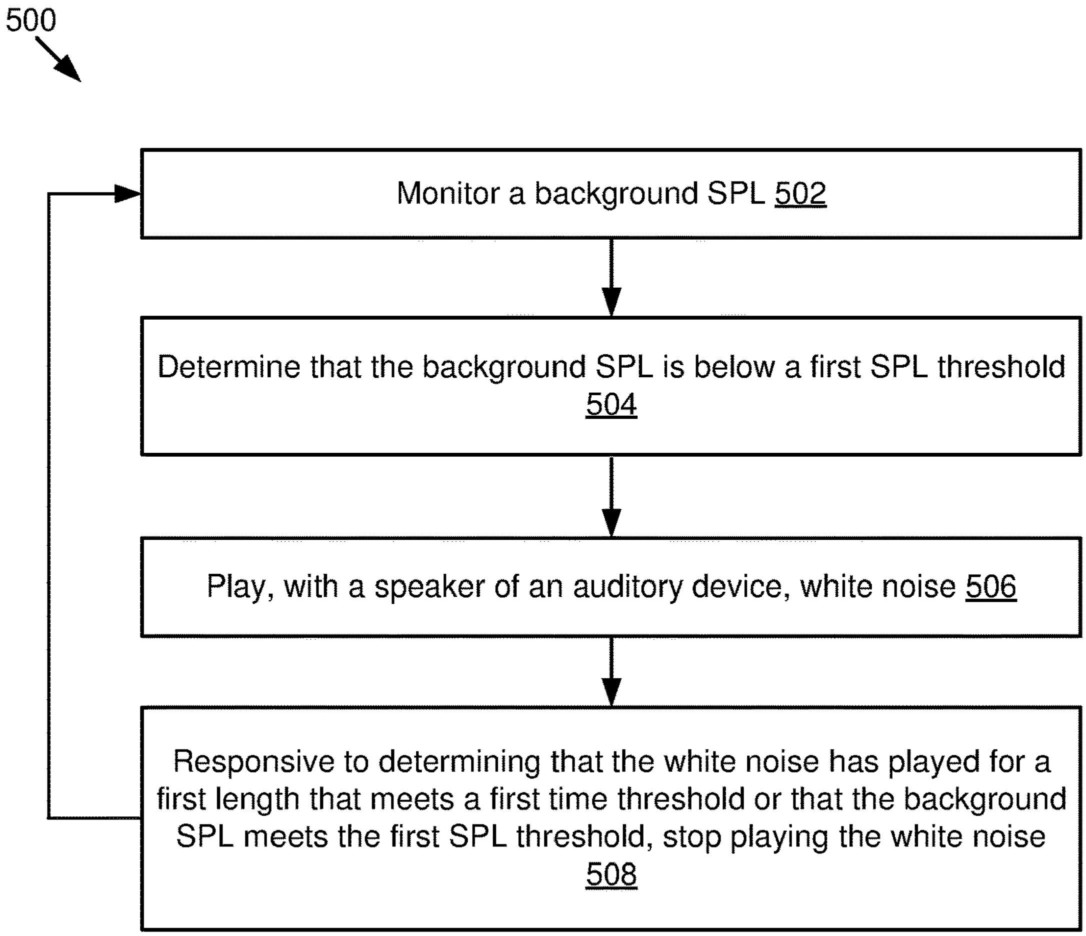
FIG. 5 illustrates a flowchart of an example method to automatically activate white noise according to some embodiments described herein.

FIG. 5 illustrates a flowchart of an example method 500 to automatically activate white noise. The method 500 may be performed by the computing device 200 in FIG. 2. For example, the computing device 200 may be the auditory device 120 or the user device 115, or in part the auditory device 120 and in part the user device 115 illustrated in FIG. 1. The computing device 200 includes a hearing application 103 that implements the steps described below.

The method may begin with block 502. At block 502, a background SPL is monitored. For example, the hearing application determines a decibel level of the background noise. Block 502 may be followed by block 504.

At block 504, the background SPL is determined to be below a first SPL threshold. For example, the first SPL threshold may be 40 decibels and defined by a default, a user, or a machine-learning model.

In some embodiments, the first SPL threshold may be based on a type of auditory device. For example, the type of auditory device may be associated with an extent to which the auditory device is designed to block out ambient noise. The first SPL threshold may be lower for auditory devices that block out more noise than for auditory devices that have holes or openings to allow some natural noise to filter through to the ear canal. Block 504 may be followed by block 506.

At block 506, a speaker of an auditory device plays white noise. Block 506 may be followed by block 508.

At block 508, responsive to determining that the white noise has played for a first length that meets a first time threshold or that the background SPL meets the first SPL threshold, the white noise stops playing. Block 508 may be followed by block 502. For example, the hearing application may continue to monitor the background SPL and repeat the process until the auditory device is turned off.

Figure 6:
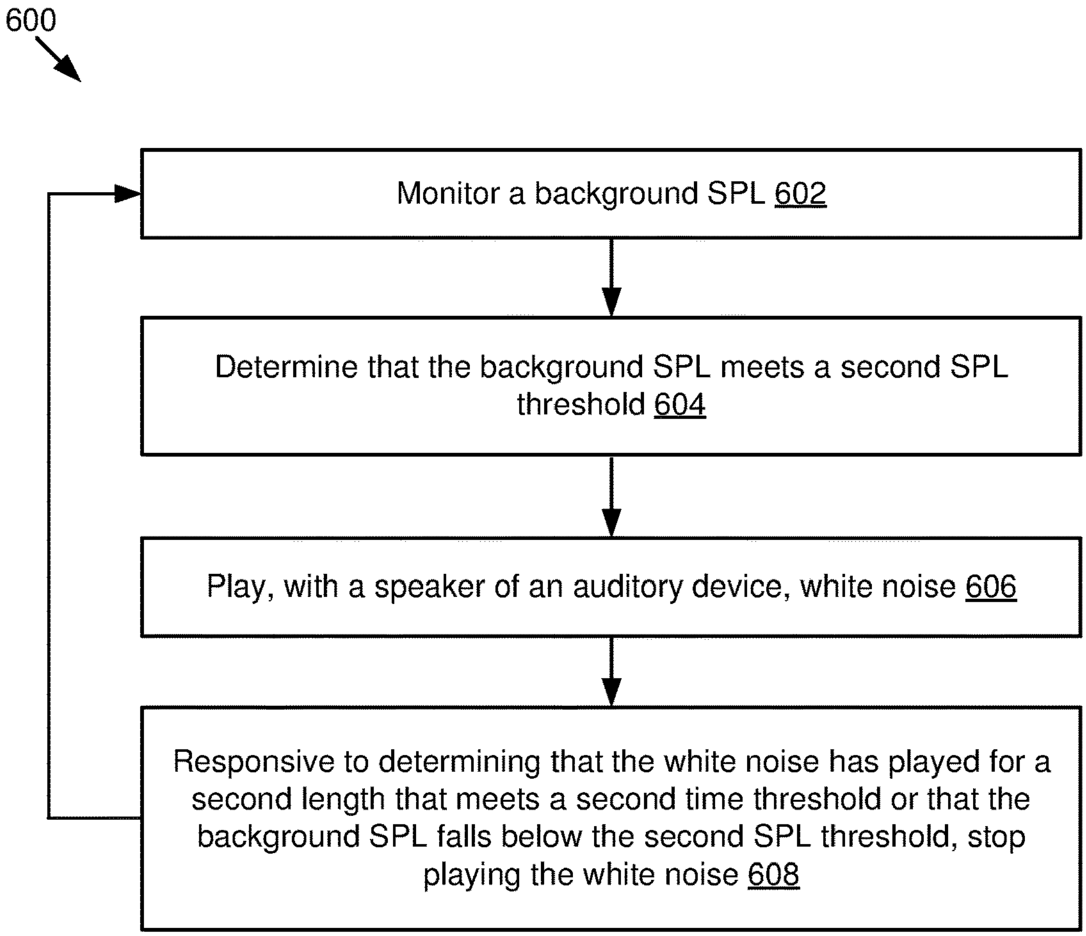
FIG. 6 illustrates a flowchart of an example method to activate white noise for sleeping purposes according to some embodiments described herein.

FIG. 6 illustrates a flowchart of an example method 600 to activate white noise for sleeping purposes. The method 600 may be performed by the computing device 200 in FIG. 2. For example, the computing device 200 may be the auditory device 120 or the user device 115, or in part the auditory device 120 and in part the user device 115 illustrated in FIG. 1. The computing device 200 includes a hearing application 103 that implements the steps described below.

The method may begin with block 602. At block 602, a background SPL is monitored. Block 602 may be followed by block 604.

At block 604, the background SPL is determined to meet a second SPL threshold. For example, the second SPL may be 40 decibels. Block 604 may be followed by block 606.

At block 606, a speaker of the auditory device plays white noise. Block 606 may be followed by block 608.

At block 608, responsive to determining that the white noise has played for a second length that meets a second time threshold or that the background SPL balls below the second SPL threshold, the white noise stops playing. Block 608 may be followed by block 602. For example, the hearing application may continue to monitor the background SPL and repeat the process until the auditory device is turned off.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method comprising:

operating a microphone of an auditory device to continuously monitoring a background sound pressure level (SPL); and using a hearing application operating in the auditory device to automatically and continuously determining whether the background SPL is below a first SPL threshold;

using the hearing application, responsive to determining that the background SPL is below the first SPL threshold, to instruct a speaker of the auditory device to play unmodulated sound made up of waves of all frequencies across the spectrum of audible sound in equal measure (white noise);

using the hearing application, responsive to determining either that the white noise has played for a first length of time that meets a first time threshold or that the background SPL is not below meets the first SPL threshold, to instruct the speaker to stop playing the white noise.

2. The method of claim 1, further comprising:

using the hearing application to training a machine-learning model to output at least one parameter selected from the group of the first SPL threshold, the first time threshold, a sound level of the white noise, and combinations thereof based on a training data set that includes hearing profiles for users, background SPLs, SPL thresholds, and time thresholds;

wherein the machine-learning model is a neural network.

3. The method of claim 2, further comprising:

receiving the background SPL and a hearing profile that corresponds to a user associated with the auditory device; and outputting at least one parameter selected from the group of the first time threshold, the first SPL threshold, a sound level of the white noise, and combinations thereof as output.

4. The method of claim 1, further comprising:

using the hearing application to determine whether the background SPL meets a second SPL threshold, higher than the first SPL threshold, during a time associated with sleeping;

using the hearing application, responsive to determining that the background SPL meets the second SPL threshold during the time associated with sleeping, to instruct the speaker to play white noise; and using the hearing application, responsive to determining either that the white noise has played for a second length of time that meets a second time threshold or that the background SPL falls below the second SPL threshold, to instruct the speaker to stop playing the white noise.

5. The method of claim 4, further comprising:

using the hearing application to training a machine-learning model to output at least one parameter selected from the group of the second SPL threshold, the second time threshold, and combinations thereof based on a training data set that includes activity data that describes movement of people associated with auditory devices, background SPLs, SPL thresholds, and time thresholds.

6. The method of claim 5, further comprising:

receiving the background SPL and activity data that corresponds to a user associated with the auditory device; and outputting at least one parameter selected from the group of the second SPL threshold, the second time threshold, a sound level of the white noise, and combinations thereof as output.

7. The method of claim 1, further comprising:

using the hearing application, responsive to receiving a request from a user to play white noise to instruct the speaker to play the requested white noise.

8. The method of claim 7, wherein the request from the user is received from at least one of a verbal instruction detected by a voice pick-up sensor, a verbal instruction detected by a microphone, a tap detected by a motion sensor, a gesture detected by the motion sensor, and user input from a user device.

9. The method of claim 1, further comprising:

generating noise cancellation sound waves that are played along with the white noise to reduce distractions from the background SPL.

10. An auditory device comprising: one or more processors; and logic encoded in one or more non-transitory media for execution by the one or more processors and when executed are operable to: operate a microphone of an auditory device to automatically and continuously monitor a background sound pressure level (SPL); operate a hearing application included in the auditory device to automatically and continuously determine whether the background SPL is below a first SPL threshold;

wherein if the hearing application determines that the background SPL is below a first SPL threshold, a speaker of the auditory device plays unmodulated white noise; and wherein if the hearing application determines either that the unmodulated white noise has played for a first length that meets a first time threshold or that the background SPL meets the first SPL threshold, the speaker automatically stops playing the unmodulated white noise.

11. The auditory device of claim 10, wherein the logic is further operable to: train a machine-learning model to output at least one parameter selected from the group of the first SPL threshold, the first time threshold, a sound level of the white noise, and combinations thereof based on a training data set that includes hearing profiles for users, background SPLs, SPL thresholds, and time thresholds; wherein the machine-learning model is a neural network.

12. The auditory device of claim 11, wherein the logic is further operable to:

receive the background SPL and a hearing profile that corresponds to a user associated with the auditory device; and output at least one parameter selected from the group of the first time threshold, the first SPL threshold, a sound level of the white noise, and combinations thereof as output.

13. The auditory device of claim 10, wherein the logic is further operable to: determine that the background SPL meets a second SPL threshold during a time associated with sleeping; play, with the speaker of the auditory device, the white noise; and responsive to determining that the white noise has played for a second length that meets a second time threshold or that the background SPL falls below the second SPL threshold, stop playing the white noise.

14. The auditory device of claim 13, wherein the logic is further operable to:

train a machine-learning model to output at least one parameter selected from the group of the second SPL threshold, the second time threshold, and combinations thereof based on a training data set that includes activity data that describes movement of people associated with auditory devices, background SPLs, SPL thresholds, and time thresholds.

15. An apparatus comprising: one or more processors; and software encoded in one or more non-transitory computer-readable media for execution by the one or more processors and when executed operable to: operate a microphone of an auditory device to continuously monitor a background sound pressure level (SPL); operate a hearing application included in the auditory device to automatically and continuously determine whether the background SPL is below a first SPL threshold; wherein if the hearing application determines that the background SPL is below a first SPL threshold, a speaker of the auditory device plays unmodulated white noise; and wherein if the hearing application determines either that the unmodulated white noise has played for a first length that meets a first time threshold or that the background SPL meets the first SPL threshold, the speaker automatically stops playing the unmodulated white noise.

16. The software of claim 15, wherein the software is further operable to: train a machine-learning model to output at least one parameter selected from the group of the first SPL threshold, the first time threshold, a sound level of the white noise, and combinations thereof based on a training data set that includes hearing profiles for users, background SPLs, SPL thresholds, and time thresholds; wherein the machine-learning model is a neural network.

17. The software of claim 16 wherein the software is further operable to: receive the background SPL and a hearing profile that corresponds to a user associated with the auditory device; and output at least one parameter selected from the group of the first time threshold, the first SPL threshold, a sound level of the white noise, and combinations thereof as output.

18. The software of claim 15, wherein the software is further operable to: determine that the background SPL meets a second SPL threshold during a time associated with sleeping; play, with the speaker of the auditory device, the white noise; and responsive to determining that the white noise has played for a second length that meets a second time threshold or that the background SPL falls below the second SPL threshold, stop playing the white noise.

19. The software of claim 18, wherein the software is further operable to: train a machine-learning model to output at least one parameter selected from the group of the second SPL threshold, the second time threshold, and combinations thereof based on a training data set that includes activity data that describes movement of people associated with auditory devices, background SPLs, SPL thresholds, and time thresholds.

* * * * *